UNITED STATES PATENT OFFICE.

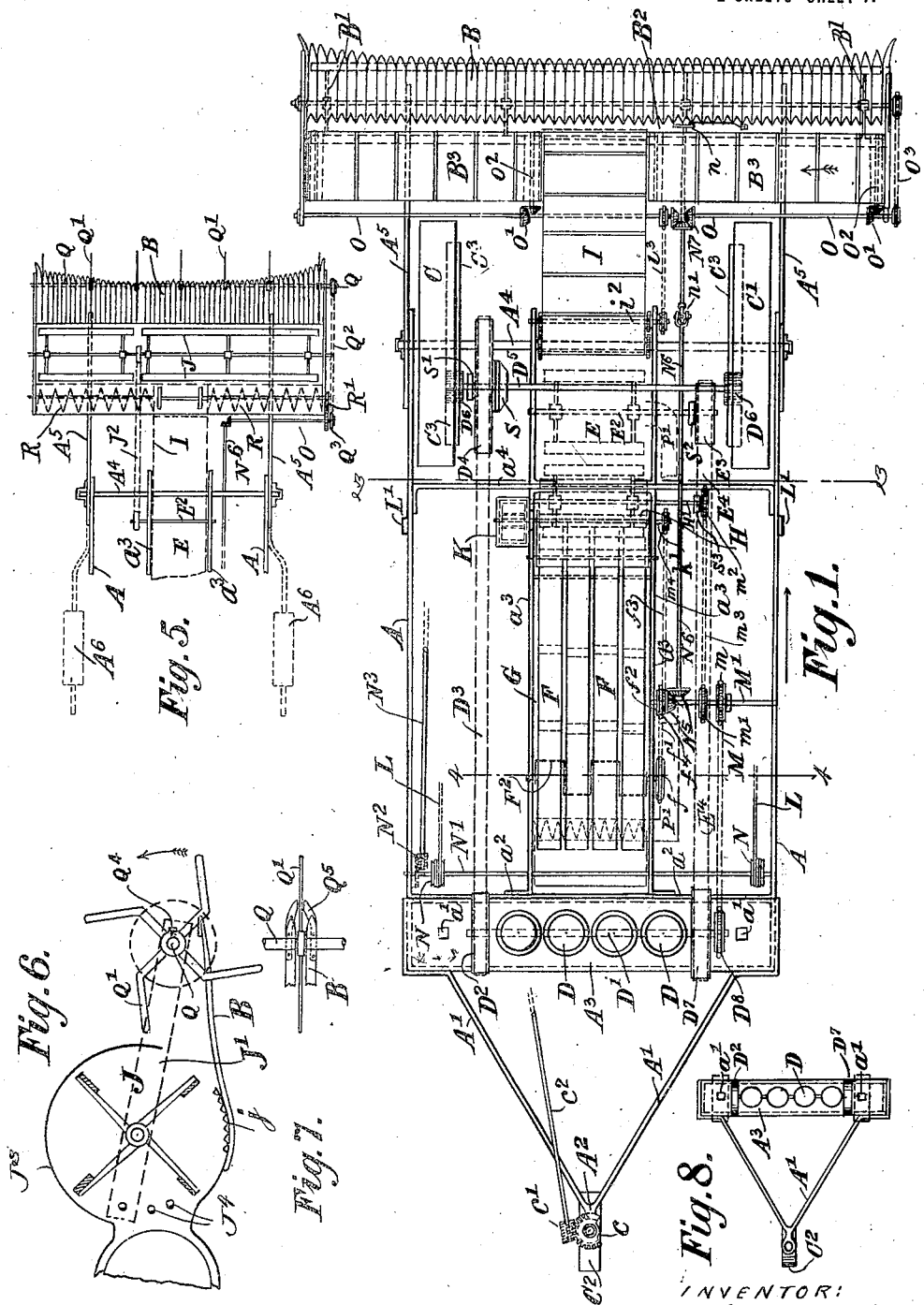

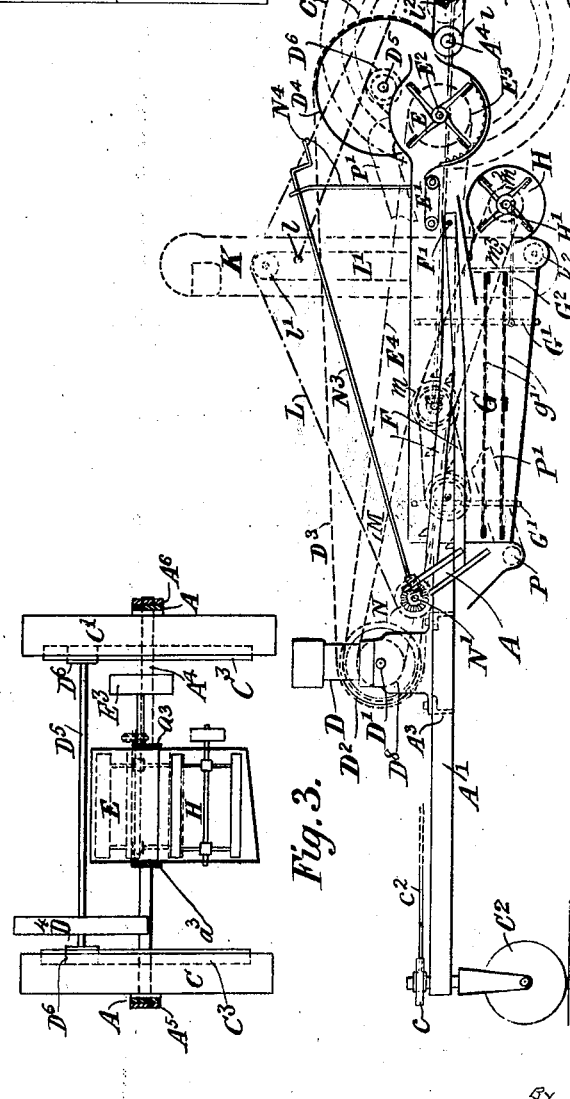

JOHN OLIVER BROOK, OF CURBAN, NEW SOUTH WALES, AUSTRALIA.

POWER-DRIVEN STRIPPER OR HEADER HARVESTER.

1,374,424.

Specification of Letters Patent.

Patented Apr. 12, 1921.

Application filed January 19, 1918. Serial No. 212,661.

*To all whom it may concern:*

Be it known that I, JOHN OLIVER BROOK, a British subject, and resident of "Hillside," Curban, in the State of New South Wales, Commonwealth of Australia, have invented new and useful Improvements in Power-Driven Stripper or Header Harvesters, of which the following is a specification.

This invention relates to improvements in power driven stripper or header harvesters and particularly to the type which severs the heads from standing crop and then threshes and winnows the grain. The object of the invention is to construct these machines in such a manner that a two-part rigidly framed carriage borne on three wheels is provided to support the several appliances for dealing with the cut or threaded heads, and to carry the motor engine from which power is derived to propel the machine and work the several grain harvesting appliances.

The aforesaid appliances are arranged tandem fashion at the longitudinal central part of the machine framing, while the comb, beaters and cutting appliances are arranged on detachable hinged adjustable frames, the gears being so arranged that the main traveling wheels are propelled by the motor independently of the gears which drive the harvesting appliances, and further the back part of the machine frame which carries the motor is detachable and may be employed for other purposes.

By employing the aforesaid means for propelling the traveling wheels, there is no development of power by said main traveling wheels, thus the machine is enabled to travel over soft or sandy soil without interfering with the speed of the harvesting machinery, also by the traveling wheels transmitting no power to the harvesting machinery, it is not so susceptible to the jerks or vibrations occasioned by the traveling wheels coming in contact with obstructions or passing over uneven land. Clutch gears are provided to allow the traveling wheels to be stopped while the motor and harvesting machinery remain in motion. Again, by dismantling the grain heads severing, threshing and cleaning appliances, the machine can be used as a farm tractor.

To convert the header machine into a stripper harvester, the forward part carrying the comb, reel, reciprocating knife and endless conveyers is removed and a similar hinged frame carrying the comb, beaters and conveyers is arranged in its place, and further the comb of the stripper harvester may when required be furnished with a rotary crop-head lifter.

The invention will now be fully described aided by a reference to the accompanying sheets of drawings in which similar letters will indicate corresponding parts, Figure 1 being a plan and Fig. 2 a longitudinal sectional elevation of a machine constructed in accordance with my improvements fitted up as a header harvester while Fig. 3 is a transverse sectional view taken approximately on the line 3—3 of Fig. 1, looking in the direction of the arrow.

Fig. 4 is a transverse sectional view taken approximately on the line 4—4 of Fig. 1, also looking in the direction of the arrow.

Fig. 5 is a plan drawn to a smaller scale of the front movable part of machine fitted up for a stripper harvester.

Fig. 6 is a transverse section drawn to a larger scale of the stripper harvester beaters and comb, and showing the comb furnished with a crop-head lifter and Fig. 7 is a plan showing the front part of comb as fitted with a crop head lifter.

Fig. 8 is a plan of the back or motor carriage part of machine frame as detached and furnished with its traveling wheels, and drawn to a smaller scale than Fig. 1.

Fig. 9 is a plan of the main frame with harvesting appliances removed and fitted up as a motor tractor and Fig. 10 is a side view of the frame carrying the bearings of the harvester appliances, the upper part of which frame is removable.

In constructing a machine of the header type, the main frame A, which may be formed of either metal or wood, projects back centrally behind the front detachable part carrying the comb B, reel B¹, reciprocating reaper knife B² and canvas conveyers B³ which stretch transversely across and at both sides, beyond the full width of said main frame A, the fore part of which latter is borne by two main traveling wheels C and C¹, while the back detachable part A¹ of the frame is V shape in plan and has at its apex a goose neck A² to receive the post of a steering wheel C², and upon the post head is a worm wheel $c$ gearing with a worm $c^1$ operated by a hand rod $c^2$, while at its fore part the detachable frame has a bed plate $A^3$ upon which the motor D is seated, said plate being provided with two square holes $a^1$ to receive the movable posts of temporary traveling wheels for transporting the motor carriage, when detached, from place to place for ordinary farm operations, such as driving a chaff cutter, circular saw or the like. The fore part of the frame $A^1$ may be detachably secured to the back bar $a^2$ of the main frame by bolts and nuts or the two said parts may be constructed in the form of a rigid inseparable framing.

The said two main traveling wheels are arranged preferably within the two outer longitudinal bars of the main frame A, while two inner longitudinal bars $a^3$ lie between the traveling wheels to support the grain threshing and cleaning appliances, consisting of the thresher E, short conveyer $E^1$, straw walkers F, riddle box G and fan H. I is a longitudinal canvas conveyer which in the header machine is at the rear of the reciprocating knife $B^2$ and receives the cut crop from the comb and the two transverse conveyers $B^3$ and delivers said cut crop to the threshing drum E. The conveyer I is supported on rollers $i$ and $i^1$ and has motion imparted to a sprocket on the spindle $i^2$ of its back roller by a chain belt $i^3$ leading from a sprocket on transverse shaft O. $B^1$ is the reel supported by bracket bearings $b^1$ secured to the comb cheeks $b^2$ which in the stripper harvester also support the concave bar $j$ of the beaters J. The main frame at its front part is supported on the main axle $A^4$ while just behind the main wheels is a transverse frame bar $a^4$ above which is the concave conveyer $E^1$ leading to the straw walkers F under which is the riddle box G containing the screens $g^1$, while at front of the screens is the blast fan H at the rear side of which is the grain elevator K.

The aforesaid detachable front part of the machine carrying the comb and beaters or the reaping appliance is supported by two arms $A^5$ pivoted on the main axle $A^4$, and if necessary provided with counter balance weights $A^6$. The comb frame is provided with sheave shackles $a^5$, each of which receives a winding rope L, one end of which is secured to a vertical stanchion $L^1$ at 1, the rope passing about the sheave shackle $a$ and over a pulley $l^1$ on stanchion $L^1$, the other end of the rope being secured to a roller or drum N carried by a transverse spindle $N^1$, supported in bearings carried on the frame A of machine. The said sheaves or drums N are rotated by worm gear $N^2$ operated by a rod $N^3$ furnished with a crank handle and supported in a bearing in stanchion $N^4$ at a position convenient to the driver. By these means the comb frame can be lifted up or adjusted in height to suit the crop.

The internal combustion motor or other power engine D, has a shaft $D^1$ which has on it a pulley $D^2$ imparting motion by belt $D^3$ to a pulley $D^4$ on a transverse shaft $D^5$, each end of the latter being furnished with a toothed pinion $D^6$ gearing with an internal toothed wheel $C^3$ secured on the main traveling wheels C and $C^1$.

The threshing drum spindle $E^2$ has a pulley $E^3$ on it which is driven by a belt $E^4$ from a pulley $D^7$ near the off end of the motor shaft, and which shaft also has a pulley or sprocket $D^8$ on it for imparting motion by a belt M to a sprocket $m$ on a counter shaft $M^1$ arranged in bearings on the frame of the machine and said counter shaft has another sprocket $m^1$ on it imparting motion to a sprocket $m^2$ on a spindle $H^1$ of the fan by a belt $m^3$. The straw walkers or shakers F are suspended on a sway bar $F^1$ while their back ends are carried by crank shaft $F^2$ which is rotated by a sprocket $f$ on said shaft having motion imparted to it by belt $f^1$ from a sprocket $f^2$ on shaft $M^1$.

The wheat elevator receives motion by said counter shaft $M^1$ having a sprocket $f^4$ on it, the belt $f^3$ of which drives a sprocket $m^4$ on the spindle $k^1$ which imparts motion to the wheat conveyers $k^2$ and elevator K. Bevel gearing $N^5$ imparts motion from shaft $M^1$ to a longitudinal spindle $N^6$ which is connected by bevel gear $N^7$ with a transverse spindle O from which the canvas conveyers $B^3$ are driven by the bevel gears $O^1$ meshing with bevel gears on spindles $O^2$, while the reciprocating cutting knife $B^2$ is driven by a disk crank $n$. The spindle of reel $B^1$ has motion imparted to it by sprockets connected with chain belt $O^3$ which derives motion from spindle O. The aforesaid longitudinal spindle $N^6$ has a knuckle joint $n^1$ in it to allow for its radial movement during the raising and lowering of the comb frame.

The riddle box G is suspended on hanging rods $G^1$ from inner framing and its shake may be imparted by an eccentric rod $G^2$ operated from an eccentric on the fan spindle $H^1$ or from any other suitable moving part of the machine. The unthreshed grain leaves the riddles by the chute P furnished with a screw conveyer and passes through the conduit or pipe $P^1$ to the thresher E to be rethreshed.

The rotary crop head lifter which is employed only on the stripper harvester consists in the arrangement above the comb of a spindle Q carrying a series of bent arms $Q^1$ of the form shown in Fig. 6, said spindle lying just above the comb and at such a position that the said arms revolve between the comb teeth to lift the wheat heads to a standing or upright position, so that the crop can be conveniently dealt with by the comb.

Sway arms J¹ are provided and one of each is bolted to the side of the beater drum casing and which arms support and carry the ends of the spindle Q. Each side J³ of the beater drum casing is provided with a number of holes J⁴ by means of which the sway arms can be bolted thereto and thus enable the spindle Q to be adjusted at any desired height over the comb. The arms Q¹ are secured to an adjustable boss on said spindle and such boss may have either two or more arms which are either curved, radial or bent as shown, each arm being of such a thickness to enable it to rotate in the comb space. Further the said arms Q¹ may be arranged to operate between each second comb space or they may be arranged to lie at any other regular distance apart. Each of the sway arms J¹ is also supported by the beater spindle, the ends of the latter passing through the arms.

The spindle Q which carries said arms is driven by sprocket and chain belting Q² from a sprocket Q³ on aforesaid spindle O, or by any other convenient means it being necessary that the rotation of the crop lifter be greater than that of the traveling wheels, so that the arms will revolve quicky enough to lift the heads up in front of the comb, and then drop it on to the comb. Each arm boss is provided with a set screw Q⁴ to lift the arms to be arranged in a spiral or straight line on the shaft or in a direction most suitable for dealing with the crop.

The points of the comb teeth between which the arms revolve, are furnished with spring guides Q⁵ to direct the wheat heads to the adjoining spaces.

In Fig. 5 the adjustable fore part of machine is shown arranged for a stripper harvester, the beaters J being arranged behind the comb B and the latter furnished with the rotary crop lifting arms Q¹, while again behind the beaters are the screw conveyers R shown driven by spur gear R¹ from the aforesaid shaft O, while the beaters J have motion imparted to them by a belt J² from a pulley on end of thresher spindle E².

A differential gear box S is provided on shaft D⁵ to regulate the travel of the machine and also to allow of the machine turning short curves, further a friction clutch is arranged at S¹ in connection with pulley D⁴, which is loose on its shaft and is capable of being clutched into gear to rotate the traveling wheels or by freeing the clutch allow the machine to stand. The threshing drum pulley E³ is also loose on its shaft and provided with a friction clutch S² for securing it to its shaft when the drum is to be operated. Pulley or sprocket m on shaft M¹ is also furnished with a clutch to allow of its being thrown in and out of gear, while the fan spindle is provided with a free wheel clutch S³ to allow the fan to run itself down after the machinery is stopped.

I do not make a claim for any particular type of differential gear or friction clutch as it is obvious that any of the known types suitable for the purposes stated may be employed in the herein described harvester, neither do I limit myself to any particular form of comb, conveyers, thresher or screening and winnowing appliances as any suitable approved type of such devices may be employed.

Having now described my invention what I claim as new and desire to secure by Letters Patent is:—

1. In a power driven stripper harvester, the combination of a comb, a crop lifter comprising a spindle, a series of bent arms extending radially from said spindle and rotatable between the tooth spaces of said comb, means for adjusting the spindle vertically above the comb teeth to permit said bent arms to guide the heads of the grain into the adjoining spaces between the teeth.

2. In a power driven stripper harvester, the combination of a comb, a crop lifter comprising a spindle, a series of bent arms arranged to rotate between the tooth spaces of said comb, and means for adjusting said spindle vertically above said comb.

3. In a power driven stripper harvester, the combination of a comb, a crop lifter comprising a spindle, a series of angularly bent arms arranged to rotate between the tooth spaces of said comb, and means for adjusting said spindle vertically above said comb.

4. A power driven harvester comprising a main frame, wheel for supporting one end of said frame, a front frame pivotally connected to the forward end of the main frame, a back frame detachably connected to the rear end of the main frame, a motor carried by the back frame, means for vertically adjusting the front frame, means operatively connecting said motor and the wheels of the main frame, and means for operatively connecting said motor with the reaping mechanism independently of the last mentioned means and to permit vertical adjustment of the front frame without disconnecting the motor from the reaping mechanism.

5. A self-propelled harvester machine, comprising a main frame supported by two traveling wheels, a front frame detachably secured to said main frame, reaping implements carried by said front frame, means for raising and lowering the same, harvesting devices disposed in tandem on said main frame, a rear motor carriage detachably secured to the main frame, a steering wheel supporting said motor carriage, means for operating the steering wheel, and means for driving the traveling wheels from the motor independently of the harvesting devices.

6. In a self-propelled harvesting machine, the combination of a main frame, a threshing spindle, a fan spindle, a straw-walkers spindle, a wheat elevator spindle, a longitudinal conveyer adapted to receive the cut crop from a pair of transverse conveyers, a countershaft mounted for rotation on said main frame, a motor carriage detachably secured to the main frame, a motor mounted thereon, means for driving said countershaft from the motor, and means for driving said spindles and conveyers from the countershaft.

7. In a power-driven stripper harvester, the combination of a frame formed of detachably connected sections, a motor mounted on one of said sections, a pair of traveling wheels supporting the other of said sections, means of transmitting motion from said motor to said wheels, and means for mounting a pair of wheels on said motor section when detached from the other section.

8. In a self-propelled harvester as set forth in claim 6, the combination with the main frame of central longitudinal bars for supporting the spindles.

In testimony whereof I have signed my name to this specification in the presence of two subscribing witnesses.

JOHN OLIVER BROOK.

Witnesses:
BEDLINGTON BODYCOMB,
LESLIE LAWTON BEAR.